C. S. NORCROSS.
CULTIVATING ATTACHMENT.
APPLICATION FILED MAY 11, 1909.

931,333.

Patented Aug. 17, 1909.
2 SHEETS—SHEET 1.

WITNESSES:

INVENTOR
C. S Norcross
BY
W. J. FitzGerald & Co
Attorneys

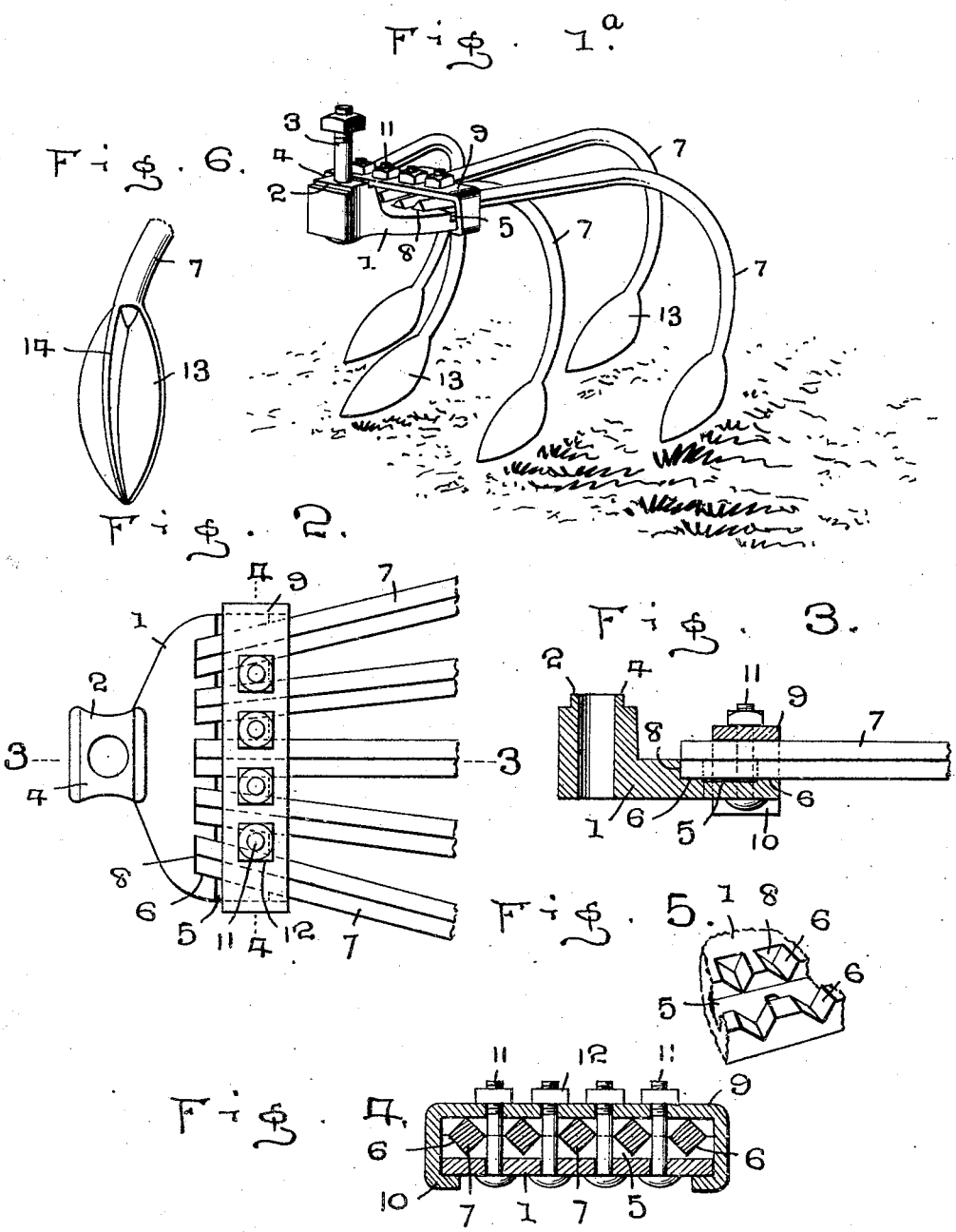

UNITED STATES PATENT OFFICE.

CAMILLO SIVARI NORCROSS, OF BUSHNELL, ILLINOIS.

CULTIVATING ATTACHMENT.

No. 931,333.　　　Specification of Letters Patent.　　　Patented Aug. 17, 1909.

Application filed May 11, 1909. Serial No. 495,338.

*To all whom it may concern:*

Be it known that I, CAMILLO S. NORCROSS, a citizen of the United States, residing at Bushnell, in the county of McDonough and State of Illinois, have invented certain new and useful Improvements in Cultivating Attachments; and I do hereby declare the following to be a full, clear, and exact description of the invention, such as will enable others skilled in the art to which it appertains to make and use the same.

My invention relates to new and useful improvements in a combined wheel supported and hand operated cultivator and my object is to provide a cultivator which may be attached to the usual or any preferred form of wheel supported frame.

A further object is to provide means whereby the cultivating attachment may be quickly removed or attached to the frame.

A further object is to provide means whereby the shovels and tines to which the same are attached, may be quickly secured in position or removed from their supporting head.

A further object is to provide the shovel integral with its tine and form a reinforcing rib on the shovel and a further object is to provide a handle and socket, said socket having means thereon whereby it may be readily attached to the cultivating attachment for converting the same into a hand cultivator.

Other objects and advantages will be hereinafter referred to and more particularly pointed out in the claims.

Figure 1:
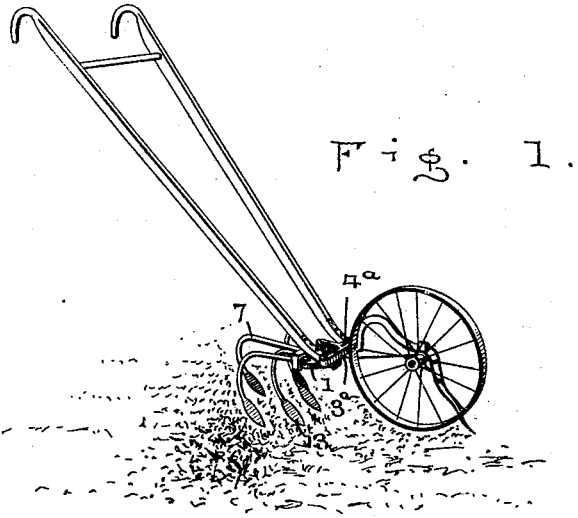
Figure 7:
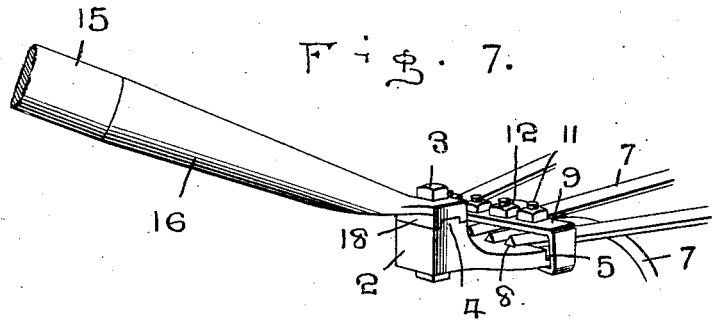
Figure 8:
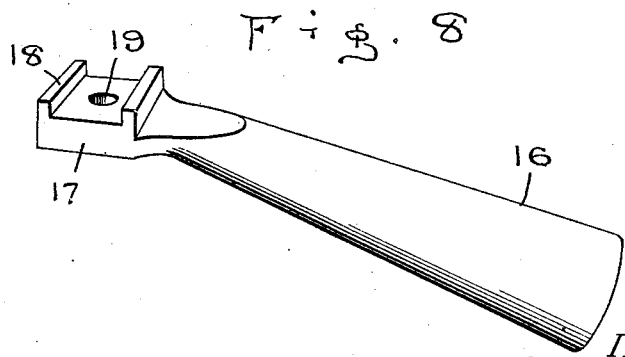

In the accompanying drawings forming part of this application, Figure 1 is a perspective view of a wheel supported frame, showing my improved cultivating attachment applied thereon. Fig. 1ª is a perspective view of the cultivating attachment removed from the frame. Fig. 2 is a top plan view of the head portion thereof on an enlarged scale. Fig. 3 is a sectional view as seen on line 3—3, Fig. 2. Fig. 4 is a transverse sectional view as seen on line 4—4, Fig. 2. Fig. 5 is a detail perspective view of a portion of the cultivator or head. Fig. 6 is a perspective view of one of the cultivator shovels and a portion of the tine therefor. Fig. 7 is a detail perspective view of a portion of the cultivator attachment showing the manner of attaching a handle thereto when used as a hand cultivator, and, Fig. 8 is a perspective view of the handle socket.

Referring to the drawings in which similar reference numerals designate corresponding parts throughout the several views, 1 indicates the head of my improved cultivator attachment which is preferably flat or plate-like and converges at its forward edge into a shank member 2, through which shank member is adapted to extend a bolt 3 for securing the attachment to the usual or any preferred form of wheel cultivator frame 3ª, the upper end of the shank member 2 having a rib 4 thereon, which is adapted to enter a slot 4ª in the cultivator frame 3ª and hold the head 1 in a fixed position and against rotation.

The upper face of the body 1 is provided with a laterally extending recess 5 which extends the full width of the head, while at each edge of said recess, are provided a plurality of V-shaped seats 6, in which are adapted to be seated, the ends of tines 7, said tines extending through the seats on the outer edge of the recess 5 and into the seats at the inner edge of said recess, the ends of the tines abutting against the end walls 8 on the inner seats.

The tines 7 are preferably square in cross section and the depth of said seats 6 is equal to substantially one-half the thickness of said tines, whereby a portion of the tines will project above the head 1 and in order to securely clamp the tines in engagement with the head, a clamping plate 9 is extended across the head and above the ends of the tines 7, the ends of the clamping plate being extended downwardly and inwardly to form ledges 10 upon which the head rests, thereby holding the clamping plate in a straight line across the ends of the tines, the forward edge of the plate terminating at a point over the recess 5.

The plate is held in engagement with the ends of the tines 7 by introducing bolts 11 through the head 1 and clamping plate 9, a bolt being introduced between each pair of tines, the upper ends of said bolts being engaged by nuts 12, which when turned onto the bolts, will tightly clamp the plate onto the tines and as the bolts pass through the recess, the downward pressure of the plate will cause the tines to slightly give immediately over the recess and thereby fixedly secure the tines to the head.

The central tine 7 is so arranged as to extend in a straight line rearwardly from the head 1, while the remainder of the tines extend at an angle to the central tine, thereby spreading or separating the rear ends of the tines so that the attachment may be employed for cultivating both sides of the row of growing plants, the plants passing through the space formed by removing the central tine and shovel and by attaching two sets of cultivators to the cultivator frame, two rows of plants may be cultivated simultaneously.

The shovels 13 are preferably integral with the tines 7 and are formed by swaging or flattening the ends of the tines to produce the shovels, a reinforcing rib 14 being formed at the same time and extended the full length of the shovel, said rib gradually tapering from the upper to the lower end of the shovel and as said rib and shovel are integral with each other and with the tine, an extremely strong and durable device will be produced. The ends of the tines containing the shovels are curved downwardly to dispose the shovels in such position as to readily enter the soil and cultivate the same and it will be readily understood that the shovels may be detachably secured to the tines if desired.

By attaching the tines to the head in this manner, said tines may be disengaged from the head without removing the clamping plate, as by loosening the bolt adjacent any one of the tines, that particular tine may be removed without disturbing the others and a new tine may be introduced, thus saving a great deal of time and labor in interchanging the tines. In this manner, a variety of tines may be provided with different sized shovels thereon, so that a greater or less degree of cultivation will be accomplished by employing different sized shovels.

In Figs. 7 and 8 I have shown means for converting the attachment into a hand cultivator and in this instance, I provide a handle 15, to the lower end of which is attached a ferrule 16, the free end of which ferrule terminates in a head 17. The head is provided on its under face with depending flanges 18, which are adapted to engage the opposite edges of the rib 4 when the handle is placed in position on the cultivator attachment, thus forming a rigid connection between the handle and shank 2, the head being fixed in position on the shank by introducing a bolt 3 through an opening 19 in the head and through the opening in the shank 2. It will thus be seen that my improved device may be quickly attached to a wheel supported frame or to the handle, as occasion may require, thus providing either a hand or wheel cultivator and it will likewise be seen that by providing a shank with a rib and attaching the same to the frame or handle in the manner shown, a rigid connection will be formed between the frame or handle and the cultivating attachment.

What I claim is:

1. In a cultivating attachment, the combination with a plate-like head having a longitudinally extending recess in its upper face and seats at opposite sides of said recess and of less depth than the recess and a shank member at the forward edge of the head; of tines, the forward ends of which are adapted to enter said seats and extend across said recess, said tines being out of engagement with the bottom of the recess, a clamping plate extending over the seated ends of the tines and having one of its edges terminating over said recess whereby the tines will be depressed into the recess at a point between their seats and means to clamp the plate into engagement with said tines.

2. In a cultivator attachment, the combination with a plate like head having a transversely disposed recess in its upper face and adjacent its rear edge, registering U-shaped seats at each edge of the recess, tines substantially square in cross section adapted to engage said seats and extend across said recess, a clamping plate disposed over the tines and having one of its edges over said recess, bolts extending through the head and clamping plate and between said tines and nuts adapted to bind the clamping plate against said tines and depress that portion of the tines between their seats into said recess.

3. In a cultivator attachment, the combination with a head, tines removably secured to said head, shovels on said tines, a shank at the forward end of said head having an opening therethrough and a rib extending upwardly therefrom; of a ferrule having a head at one end, depending flanges on said head adapted to engage the rib on the shank, a bolt extending through said shank and head to lock the head in position on the shank and a handle attached to said ferrule.

In testimony whereof I have signed my name to this specification in the presence of two subscribing witnesses.

CAMILLO SIVARI NORCROSS.

Witnesses:
WILLIAM H. HEATON,
E. K. WESTFALL.